US011919359B2

(12) United States Patent
Backes et al.

(10) Patent No.: US 11,919,359 B2
(45) Date of Patent: Mar. 5, 2024

(54) MOBILE CRANE TRAVEL GEAR AXLE

(71) Applicant: Manitowoc Crane Group France SAS, Dardilly (FR)

(72) Inventors: Bernd Backes, Oberthal (DE); Dieter Stuhrwoldt, Wilhelmshaven (DE); Frank C. Schnittker, Wurzburg (DE)

(73) Assignee: MANITOWOC CRANE GROUP FRANCE SAS, Dardilly (FR)

( * ) Notice: Subject to any disclaimer, the term of this patent is extended or adjusted under 35 U.S.C. 154(b) by 194 days.

(21) Appl. No.: 16/767,850

(22) PCT Filed: Nov. 7, 2018

(86) PCT No.: PCT/EP2018/080396
§ 371 (c)(1),
(2) Date: May 28, 2020

(87) PCT Pub. No.: WO2019/120734
PCT Pub. Date: Jun. 27, 2019

(65) Prior Publication Data
US 2020/0290419 A1    Sep. 17, 2020

(30) Foreign Application Priority Data
Dec. 22, 2017    (DE) .................. 10 2017 131 165.3

(51) Int. Cl.
*B60G 3/20*    (2006.01)
*B60K 7/00*    (2006.01)
(Continued)

(52) U.S. Cl.
CPC ............... *B60G 3/20* (2013.01); *B60G 3/202* (2013.01); *B60K 7/0007* (2013.01);
(Continued)

(58) Field of Classification Search
CPC ........ B60G 3/20; B60G 3/18; B60G 2200/14; B60K 7/0015; B60K 2007/0038; B60K 17/358; B60Y 2200/416; B66C 23/62
See application file for complete search history.

(56) References Cited

U.S. PATENT DOCUMENTS 3,581,682 A * 6/1971 Kontranowski ..... B60K 7/0015
180/308
3,997,018 A * 12/1976 Herbst .................... E02D 3/026
301/6.5
(Continued)

FOREIGN PATENT DOCUMENTS

DE    3806709 A1    1/1992
DE    20020953 U1    5/2002
(Continued)

OTHER PUBLICATIONS

JPO Office Action dated Jul. 6, 2021 and English language summary of same issued in connection with corresponding JP Pat. Appl. 2020-534197.
(Continued)

*Primary Examiner* — Frank B Vanaman
(74) *Attorney, Agent, or Firm* — Cook Alex Ltd.

(57) ABSTRACT

A mobile crane drive assembly axle includes mutually independent suspensions of wheel carriers arranged on both sides of the drive assembly frame of the mobile crane. The suspensions each include at least one transverse control arm which couples the wheel carrier onto the drive assembly frame and is connected to the drive assembly frame such that it can be rotated about an axis which extends substantially parallel to the longitudinal axis of the drive assembly frame.

8 Claims, 4 Drawing Sheets

Figure 1:
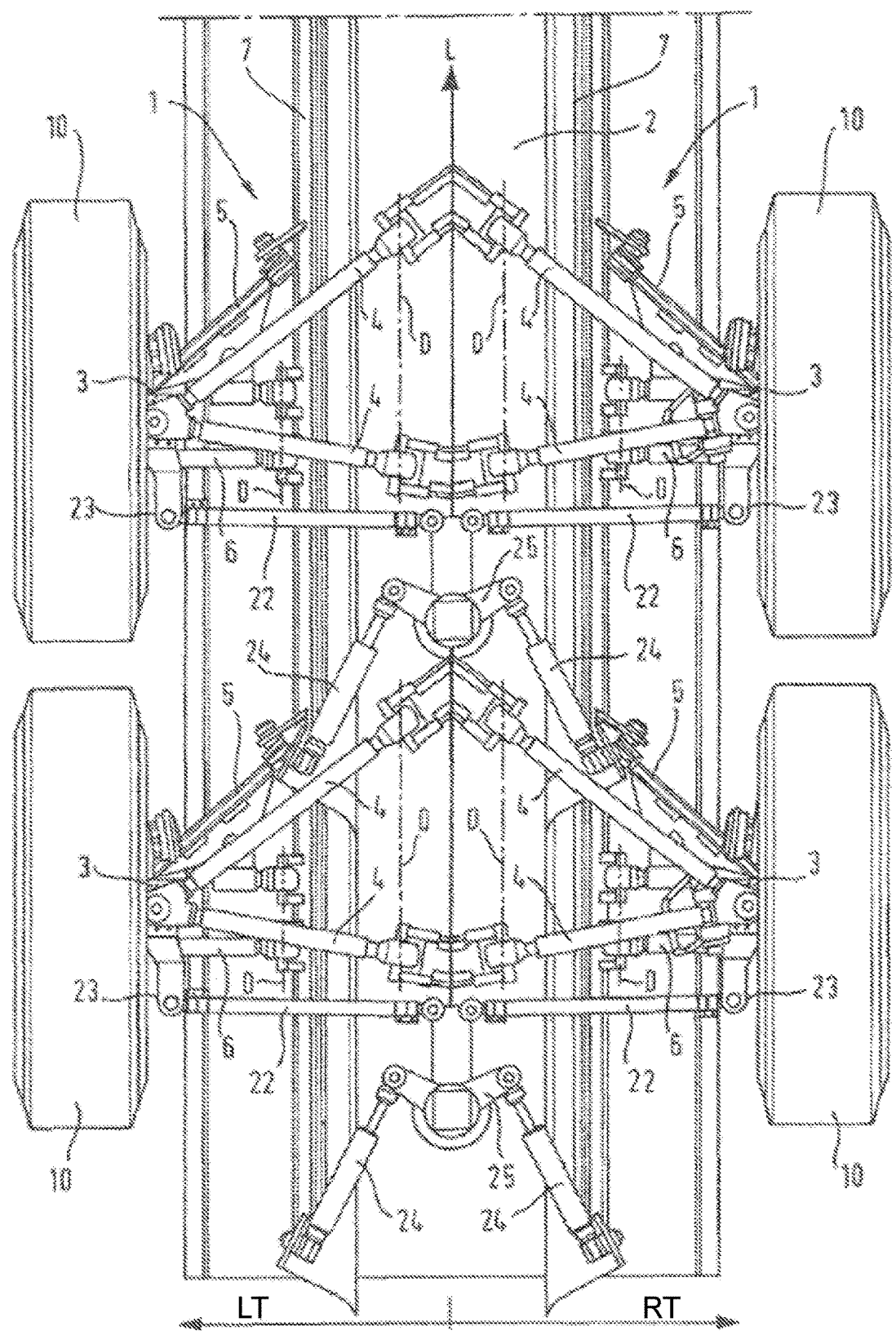

(51) Int. Cl.
  *B62D 5/12* (2006.01)
  *B66C 9/14* (2006.01)
  *B62D 5/06* (2006.01)
  *B66C 23/00* (2006.01)

(52) U.S. Cl.
  CPC .............. *B60K 7/0015* (2013.01); *B62D 5/12* (2013.01); *B66C 9/14* (2013.01); *B60G 2200/14* (2013.01); *B60G 2300/06* (2013.01); *B60K 2007/0038* (2013.01); *B60K 2007/0092* (2013.01); *B60Y 2200/416* (2013.01); *B62D 5/061* (2013.01); *B66C 23/54* (2013.01); *B66C 2700/0378* (2013.01)

(56) References Cited

U.S. PATENT DOCUMENTS

| | | | | |
|---|---|---|---|---|
| 4,266,679 | A | * | 5/1981 | Juergens .............. B66C 23/78 180/9.1 |
| 4,968,056 | A | * | 11/1990 | Haraguchi .............. B60G 3/20 280/124.135 |
| 5,257,801 | A | * | 11/1993 | Matsuzawa .............. B60G 3/26 280/124.138 |
| 5,472,062 | A | * | 12/1995 | Nagai .................. B60G 13/001 180/255 |
| 5,542,492 | A | | 8/1996 | Kasper |
| 6,182,979 | B1 | * | 2/2001 | Lee ........................ B60G 7/006 280/5.506 |
| 2002/0020982 | A1 | * | 2/2002 | Boucquey ................ B60G 3/20 280/124.135 |

FOREIGN PATENT DOCUMENTS

| | | |
|---|---|---|
| DE | 102015001864 A1 | 8/2016 |
| DE | 102016003885 A1 | 10/2017 |
| EP | 0620132 A1 | 10/1994 |
| EP | 0701510 A1 | 3/1996 |
| JP | H8510971 A | 11/1996 |
| JP | 2000159481 A | 6/2000 |
| JP | 2006312393 A | 11/2006 |
| JP | 2009274561 A | 11/2009 |
| JP | 2012144228 A | 8/2012 |
| WO | 94029133 A1 | 12/1994 |

OTHER PUBLICATIONS

International Search Report and Written Opinion dated Nov. 7, 2018 issued in connection with corresponding application PCT/EP2018/080396.

* cited by examiner

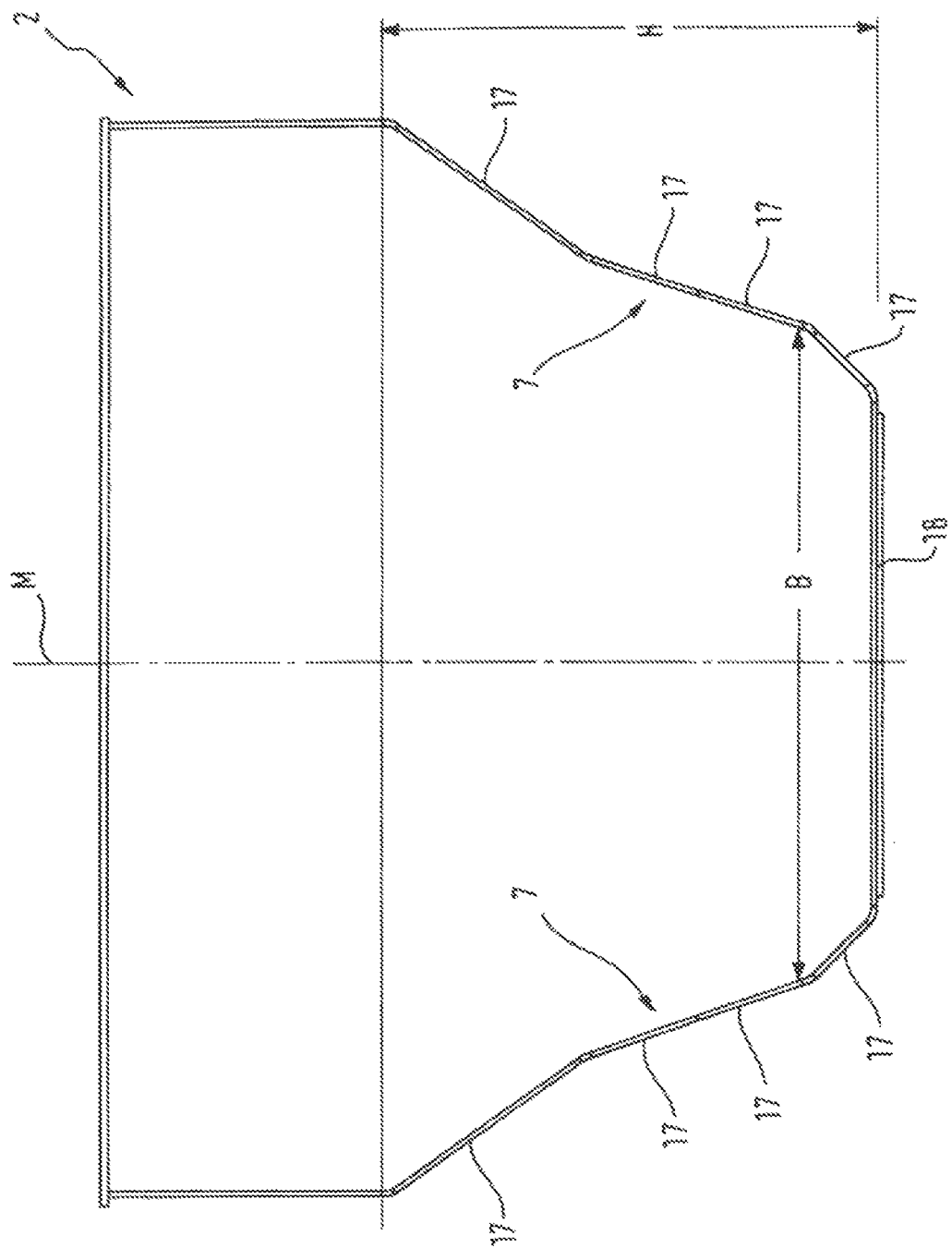

MOBILE CRANE TRAVEL GEAR AXLE

The invention relates to a drive assembly frame comprising a drive assembly axle for a mobile crane, in which the wheels mounted at the opposite ends of the axle are suspended on the drive assembly frame of the mobile crane, independently of each other, by means of at least one transverse control arm each.

In the field of mobile cranes, the so-called "rigid axle" is a widely used design for suspending the drive assembly wheels on the drive assembly frame of the mobile crane. In the case of such rigid axles, shown for example in DE 200 20 953 U1, the drive assembly wheels are mounted on both sides of the drive assembly frame on a common axle carrier which is in turn connected to the drive assembly frame. This technical solution does however have the disadvantage that the wheels of an axle interact when spring-compressed. The axle carrier also occupies a significant design volume, which comes at the expense of the space available for the drive assembly frame on the one hand and at the expense of the ground clearance on the other.

In order to address these problems, solutions in crane construction for so-called "individual wheel suspensions" have already been suggested, in which the wheels of a drive assembly axle are suspended on the drive assembly frame independently of each other. Examples of this are given in documents DE 3806709 A1 and DE 102016003885 A1. These solutions are based on components configured especially for this axle structure, which must then be elaborately restructured if the installation parameters change, such as if they are used on a different type of crane.

It is the object of the present invention to provide a drive assembly axle for a mobile crane which occupies as small a design space as possible and which can also be easily adapted to different geometric parameters.

This object is solved by the subject-matter of independent patent claim 1, wherein the sub-claims define preferred embodiments of the present invention.

The mobile crane drive assembly axle of the drive assembly in accordance with the invention comprises mutually independent suspensions of the wheel carriers arranged on both sides of the drive assembly frame of the mobile crane, wherein the suspensions each in turn comprise at least one transverse control arm. This transverse control arm couples the respective wheel carrier onto the drive assembly frame and is connected to the drive assembly frame such that it can be rotated about a rotational axis which extends substantially parallel to the longitudinal axis of the drive assembly frame and is defined by at least one joint, wherein it can be connected to the drive assembly frame by at least one rotary joint, wherein spherical joints would be equally conceivable for this purpose. The drive assembly in accordance with the invention comprises one or more of the drive assembly axles described herein, which in turn comprises or each comprise two wheel suspensions on both sides of the drive assembly frame.

In other words, at least one transverse control arm is provided on both sides of the drive assembly axle for suspending the drive assembly wheels, such that the respective wheels are guided relative to the drive assembly frame by said at least one transverse control arm when spring-compressed and spring-extended, without interacting in the process. When the wheels are spring-compressed and spring-extended, the transverse control arms are moved substantially parallel to planes which extend substantially perpendicular to the horizontal longitudinal axis of the drive assembly frame.

In accordance with a preferred embodiment, the drive assembly axle in accordance with the invention is embodied as a double transverse control arm axle, i.e. the suspensions are embodied as double transverse control arm suspensions, such that the wheel carriers are coupled onto the drive assembly frame via at least two mutually overlying transverse control arms, wherein the vertical position of the mutually overlying transverse control arms within the respective suspension of the drive assembly axle in accordance with the invention can respectively define a plane which is referred to in the following as the control arm plane within the respective suspensions of the drive assembly axle in accordance with the invention.

The drive assembly axle in accordance with the invention can in principle be embodied as a so-called "multiple control arm axle", in which the respective wheel carriers are guided relative to the drive assembly frame via at least one transverse control arm and other control arms, wherein the other control arms are preferably embodied as control rods which are connected to the wheel carrier and the drive assembly frame via a joint each. The other control arms can correspondingly be configured as longitudinal control arms exhibiting a rotational axis which extends substantially perpendicular to the longitudinal axis of the drive assembly frame, or equally as oblique control arms exhibiting a rotational axis which extends obliquely relative to the longitudinal axis of the frame.

With regard to the transverse control arm or arms used in accordance with the invention, control rods comprising a bearing on each of the drive assembly frame and the wheel carrier are in principle conceivable as a design, or equally triangular control arms comprising one bearing with respect to the wheel carrier and two bearings on the frame. A so-called quadrilateral control arm, in particular a trapezoid control arm or parallel control arm, comprising two bearings on each of the wheel carrier and the frame would also be conceivable.

In accordance with a preferred embodiment of the drive assembly axle, each control arm plane of the double transverse control arm wheel suspension comprises one triangular control arm or quadrilateral control arm each, wherein at least one control arm plane, in particular an upper control arm plane, comprises another control rod. This other control rod can in turn preferably be configured as a transverse control arm.

In accordance with another preferred embodiment of the drive assembly axle, a first control arm plane—in particular, a lower control arm plane—comprises a triangular control arm or quadrilateral control arm, wherein a second control arm plane—in particular, an upper control arm plane—comprises two control rods. The second control arm plane can also comprise a longitudinal or oblique control arm which is embodied as a control rod and via which the braking and drive torque is supported.

The suspensions of the drive assembly axle can also be configured such that at least one transverse control arm, in particular a transverse control arm of the lower control arm plane, extends from the wheel carrier up to and into the central region of the drive assembly frame, i.e. as far as possible towards the vertical midplane of the drive assembly frame. In addition, the suspensions of the drive assembly axle can also be configured such that at least one transverse control arm, in particular a transverse control arm of the upper control arm plane, extends from the wheel carrier up to a vertical side wall of the drive assembly frame.

In combination with a first aspect in accordance with the invention, namely the transverse control arm individual wheel suspension described above, the present invention can also comprise another aspect in accordance with the invention, namely a wheel carrier such as is described below. It may be noted at this juncture that this wheel carrier can be an autonomous invention, independently of the other aspects described herein. All the aspects described herein can be regarded as autonomous inventions when considered in their own right or can however also co-operate in any expedient combination. The drive assembly design proposed can in particular comprise wheel carriers as a structural element, in order to present a technically implementable system exhibiting functional relationships between the individual structural components.

The wheel carrier in accordance with the invention, for a mobile crane drive assembly, is configured to connect the energy supply and/or power supply of a wheel hub drive for driving the wheel mounted on the wheel carrier, wherein the wheel hub drive comprises an electric motor or hydraulic motor. In other words, each wheel carrier already bears the motor necessary for driving the wheel, and its supply connections, such that a conventional drive train comprising a central drive motor, one or more gears, and drive shafts extending up to the wheel carriers can be omitted, wherein the wheel hub drive in accordance with the invention can be configured as a direct drive or can however also be configured to comprise a planetary gear, connected downstream of the motor, and a multi-disc braking device as a parking and operating brake.

In accordance with a preferred embodiment of the wheel carrier in accordance with the invention, the latter can possess a bearing head which is mounted on the actual wheel carrier body via a joint, in particular a rotary joint. A spring suspension cylinder of the wheel suspension or also at least one control arm of the wheel suspension can then act on this bearing head. Since the bearing head is connected to the wheel carrier body via a joint, it is possible to kinematically decouple the bearing head from the movements of the wheel carrier body. In other words, the bearing head will not be rotated along with the wheel carrier body, for instance at steering lock, but rather remains substantially in its original position. This not only enables suspension parts, such as for instance spring suspension cylinders or control arms, to be easily connected up to the bearing head and therefore to the wheel carrier body, but also enables an energy and/or power supply for the wheel hub drive to be connected mechanically securely with respect to its position and orientation. Depending on whether the drive motor is configured as an electric motor or a hydraulic motor, this supply comprises internal, electrically conductive or fluid-guiding conduits which, by being connected positionally stably to the bearing head which is connected to the wheel carrier body in a joint, are exposed to lower mechanical stresses than would be the case if they were directly connected to a wheel carrier which is fixedly connected to the wheel hub. In order to transmit the energy or power to the drive motor which is fixedly connected to the wheel carrier, a feedthrough from the bearing head to the wheel carrier body is however necessary. In accordance with a preferred embodiment of the invention, this is realised as a so-called rotary union comprising sliding contacts/slip rings for an electric solution and/or grooves/bores for a hydraulic solution and is described in more detail further below.

The electric drive or hydraulic drive affords the option of recovering the kinetic energy of the vehicle during slowing, by switching the wheel drives to pump and/or generator operations and enabling the energy thus recovered to be stored in a storage device such as for instance a hydraulic or electric accumulator. The hydraulic or electromechanical drive enables a zero-wear regenerative and/or hydraulic braking effect and saves fuel during acceleration by additionally drawing energy from the storage device in a regulated way.

The electric solution additionally provides the option of emission-free operations within buildings, either by feeding the vehicle drive completely from the onboard electric accumulator or by detachably connecting the vehicle drive to external energy feeds such as for instance a mains connection or transformer cable connection. This "in-house" mode of operation is in particular advantageous when the crane is being driven on a level surface and at low speeds. In combination with superstructure functions which are operated solely electrically, this enables a fully or partially hybrid drive for all the essential crane functions.

Another aspect which can supplement one of the aforesaid aspects relates to combining, as described in the following, the track rods and the steering rods to form combined drive assembly elements which shall be referred to in the following as track-steering rods. The combined track-steering rod can be arranged in the plane of the lower triangular control arm, in order to minimise the steering errors arising.

The track-steering rods of a drive assembly axle can also substantially exhibit the length of the respective transverse control arms arranged in the lower control arm plane, which likewise helps to minimise the steering errors arising when the wheels are spring-compressed and spring-extended.

The steering gear which is arranged centrally in relation to the structural centre axis of the drive assembly frame can then be actuated by hydraulic or electromechanical cylinders. Steering activation, tracking and triangular control arms can thus lie in one plane, in order to minimise aforesaid errors in the drive assembly dynamics.

Another aspect which can enable and/or supplement one of the aforesaid aspects relates to the mobile crane drive assembly frame described in the following.

The drive assembly frame in accordance with the invention, for a mobile crane, is configured across its length, at least in sections, as a hollow profile and can also be embodied to be symmetrical or also asymmetrical in relation to a vertical midplane. In addition to a substantially horizontal upper and lower side of the profile, the profile in accordance with the invention comprises vertical or angled profile sides which connect the upper side of the profile to the lower side of the profile on the respective side of the frame and, together with the latter, form a hollow profile. These profile sides are constructed from at least two and preferably more individual profile segments which are connected to each other in accordance with the invention such that the horizontal width of the profile increases from the lower side of the profile up to a predetermined vertical height of the drive assembly frame, wherein it is conceivable for the frame width to remain constant over at least a section of the height. The frame width can equally be ever-increasing in an upward direction, albeit at different rates in different sections of the height. Above the predetermined height, any cross-sectional progression of the drive assembly frame is again possible, including a decrease in the frame width across at least a section of the height. In addition to a symmetrical profile, a profile which is asymmetrical in relation to the midplane of the drive assembly frame would in principle also then be conceivable.

It is then conceivable for individual profile segments to be configured as straight profile segments, wherein profile segments which are angled inwards or outwards in relation to the structural vertical axis of the drive assembly frame are equally conceivable. The profile segments can also directly abut against each other, although intermediate segments which are at an angle to each other and represent a certain transition radius between individual profile segments in the profile are also conceivable.

The mobile crane drive assembly frame described above, in conjunction with the drive assembly axle in accordance with the invention, allows the maximum provided design space to be utilised, and in particular enables a crane undercarriage which is lighter and has a higher load capacity than known solutions.

In the following, the invention is described in more detail on the basis of preferred embodiments of the aspects in accordance with the invention. It can include individual features or also any expedient combination of multiple features from any aspects of the invention.

Figure 2:
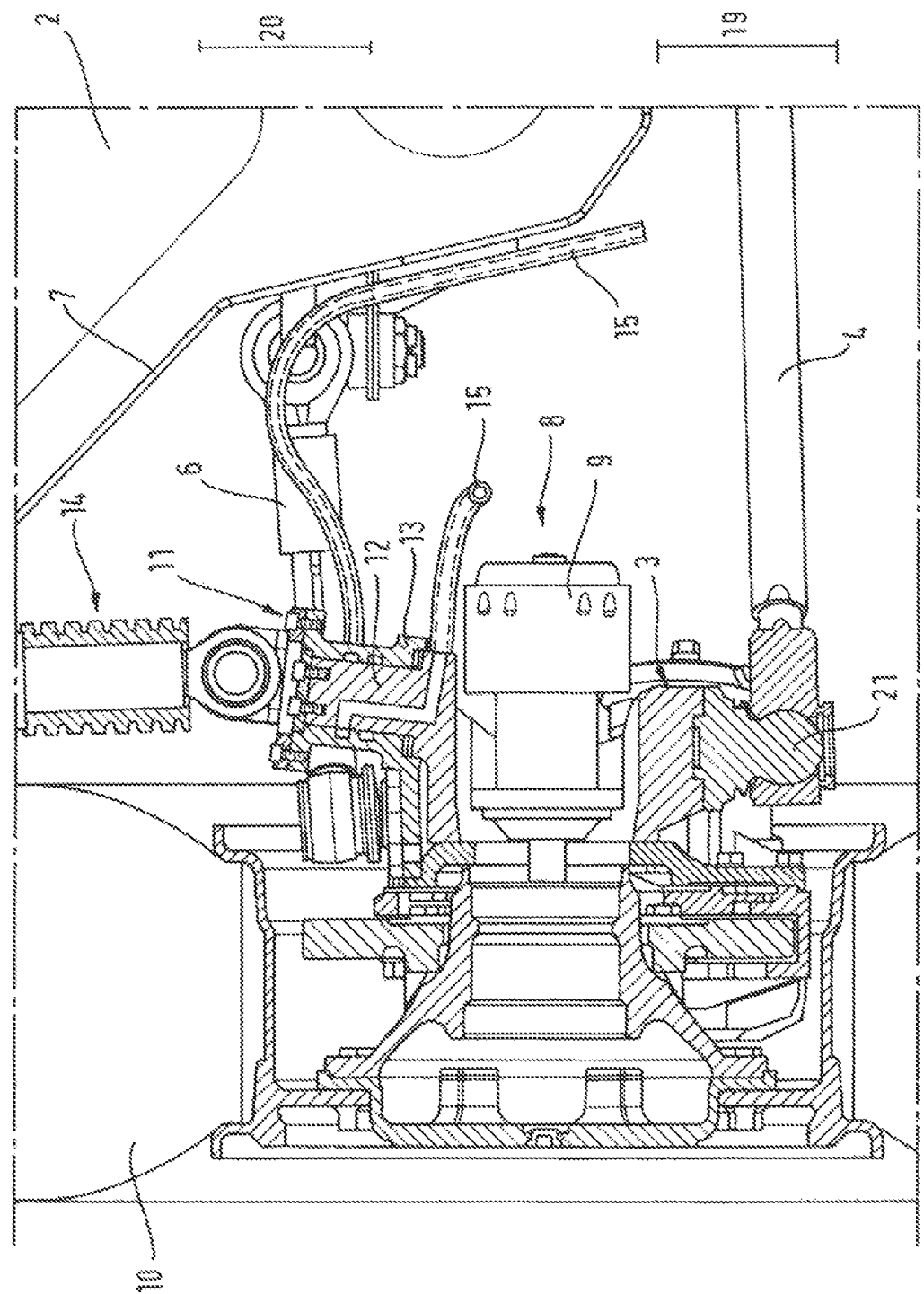
Figure 3:
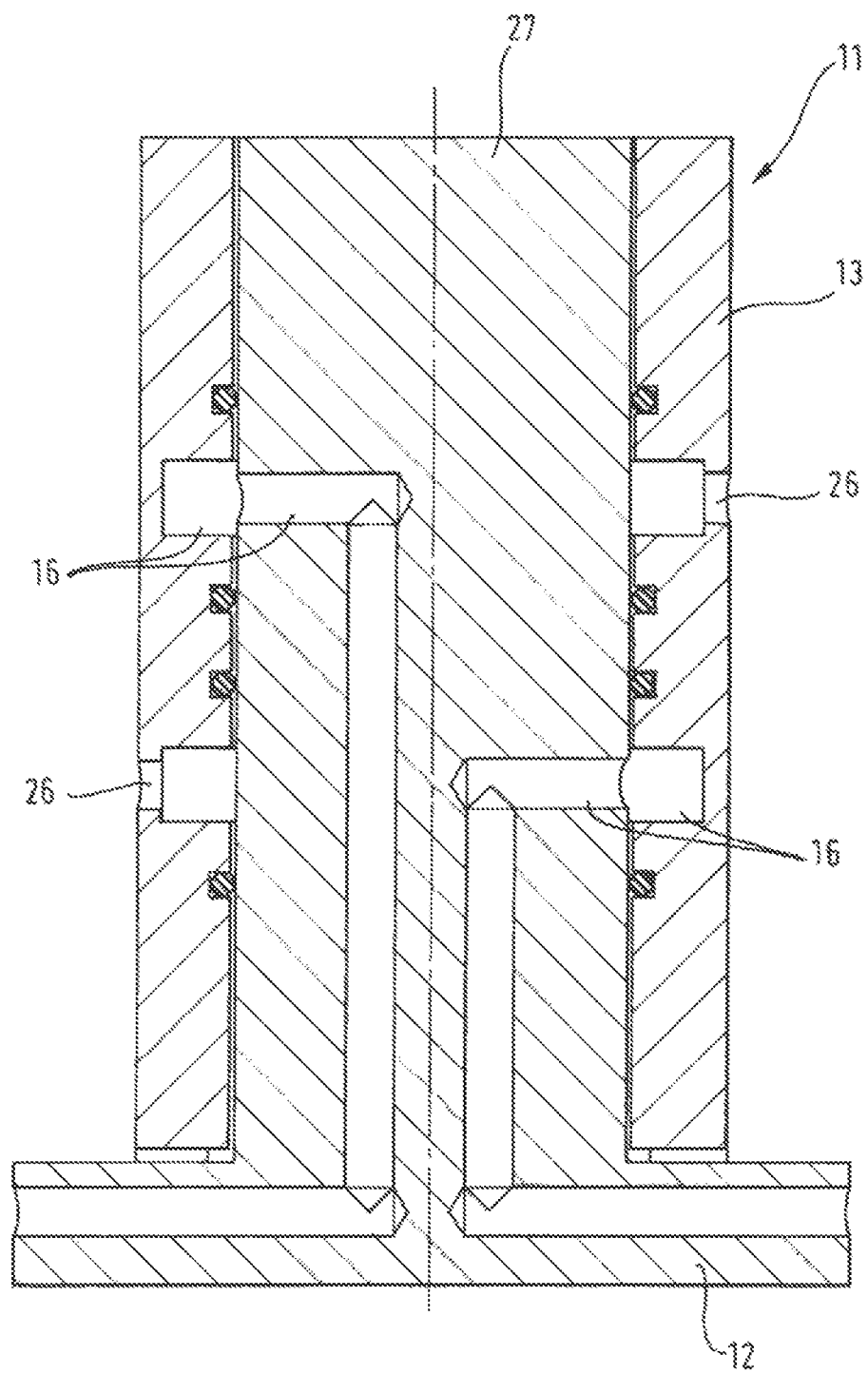

There is shown:

FIG. 1 a view of the mobile crane drive assembly axle in accordance with the invention, assembled on a crane drive assembly frame, from below;

FIG. 2 a sectional view through the mobile crane wheel carrier in accordance with the invention;

FIG. 3 a detailed view of a rotary bearing of the wheel carrier from FIG. 2;

FIG. 4 a sectional view of the mobile crane drive assembly frame in accordance with the invention.

FIG. 1 is an example of a view showing two identical drive assembly axles in accordance with the first aspect of the present invention, which are assembled on a mobile crane drive assembly frame in accordance with another aspect of the present invention. Each of the drive assembly axles is configured as a double transverse control arm drive assembly axle, wherein a transverse control arm 4 is provided on both sides, i.e. a left side LT and a right side RT, of the drive assembly frame, and which is formed as a triangular control arm is arranged in a lower control arm plane 19 (FIG. 2) and acts on the drive assembly frame 2 via two spaced rotary joint bearings situated near the centre of the frame. The global rotational axis D of the triangular control arm 4 thus extends parallel to longitudinal axis L of the frame. At the outer end, the triangular control arm 4 is rotatably coupled to the wheel carrier 3 via a spherical joint 21 (see FIG. 2). The combined track-steering rods 22 which act on the wheel carrier 3 via the steering levers 23 are also arranged in the lower control arm plane 19. Spring-compressing and/or spring-extending the steering cylinders 24 in opposite directions causes a steering lock of the wheels 10 of the relevant vehicle axle via the central steering lever 25 and the track-steering rods 22 connected to it. Turning the wheel carrier 3 at steering lock is enabled in the lower control arm plane 19 by the spherical joint 21 on the lower triangular control arm 4 and, by contrast, in the upper control arm plane 20 by the rotary joint 11 which is formed between the wheel carrier body 12 and the bearing head 13.

The embodiment shown likewise comprises a triangular control arm 5 in the upper control arm plane 20, which—like the control rod 6—is formed as a transverse control arm and is pivoted together with it on the drive assembly frame 2 about a common rotational axis D as soon as the corresponding wheel 10 is spring-compressed or spring-extended. Since the rotary joint 11 does not permit any rotation about a horizontal rotational axis, the transverse control arms 5 and 6 are—like the spring suspension cylinder 14—coupled to the bearing head 13 via spherical joints and/or rotary joints which are not indicated in further detail. At the frame end, the spring suspension cylinder 14 and the transverse control arms 5 and 6 are likewise mounted via rotary joints.

As can be seen from FIGS. 1 and 2, guiding the relatively long lower triangular control arms 4 below the drive assembly frame 2 and significantly shortening the upper transverse control arms 5 and 6 enables the drive assembly frame 2 to be significantly widened in its width or equally in its depth as compared to conventional solutions, without having to provide apertures or cavities in the drive assembly frame 2 for the control arms or other parts of the drive assembly for this purpose. Since the frame cross-section is constant across the length of the frame and nonetheless greatly widened, a crane undercarriage is provided which is extremely easy to build and nonetheless has a very high load capacity as compared to conventional solutions. Structuring the drive assembly axle as a double transverse control arm axle in accordance with the invention also enables standardised components to be used to a high degree, which enables not only a drive assembly axle which is cheap and easy to build but above all a high and uninvolved capacity to be adapted to different types of crane exhibiting different geometric parameters for the drive assembly axle.

FIG. 2 shows a cross-section through a wheel carrier 3 in accordance with the invention which represents a second aspect of the present invention. The wheel carrier 3 in accordance with the invention comprises its own drive, for the wheel 10 which it mounts, in the form of a wheel hub drive 8. In the embodiment shown, the wheel hub drive 8 comprises a hydraulic motor 9 which is borne by the wheel carrier 3, coaxially with the wheel 10, and drives the latter via a planetary gear and a switchable coupling. In order to supply the motor 9 with power, a hydraulic power supply 15 is provided, comprising a hydraulic feed and drainage of the hydraulic oil provided for this purpose. The hydraulic conduit coming from the drive assembly frame 2 of the crane undercarriage is directly connected to the bearing head 13 which remains substantially stable in its location relative to the spring suspension cylinder 14 and the transverse control arms 5 and 6, as soon as the wheel 10 together with the wheel carrier 3 experiences steering lock. Consequently, the stress on the hydraulic conduit leading to the bearing head 13, caused by steering lock, is negligibly small. The hydraulic oil then continues to the hydraulic motor 9 via a rotary union 16 in the rotary joint 11. For this purpose, annular grooves are incorporated into the cylindrical inner surface of the bearing head 13 for the oil feed or equally the oil drainage, wherein in co-operation with radial bores and connecting axial bores in the cylindrical bearing journal 27 of the wheel carrier body 12, said annular grooves form a feedthrough for the hydraulic oil via the elements which rotate relative to each other, i.e. the bearing head 13 and the wheel carrier body 12. The motor 9 which is fixed in its location relative to the wheel carrier 3 can be supplied from the bores in the wheel carrier body 12 via static hydraulic conduits. In the embodiment shown, the oil leaving the motor 9 is guided back towards the drive assembly frame 2 in an identical way to how it is fed.

FIG. 4 shows another aspect of the present invention, namely a mobile crane drive assembly frame 2 which is configured as a hollow profile and exhibits a frame width B which is ever-increasing in an upward direction in the lower region up to a predetermined height H.

For this purpose, the frame 2 which is symmetrical with respect to the vertical plane of symmetry M is constructed from multiple profile segments 17 in the lower region which are connected to each other such that the profile walls 7 formed by the profile segments 17 widen in an upward direction. Viewed as a whole relative to the side wall 7, the individual profile segments form a reinforcing zigzag pattern, i.e. the side B of the frame increases at alternately pronounced rates in an upward direction. Above the predefined height H, the frame 2 can exhibit a constant width, wherein a width which increases or also decreases at least in sections is equally conceivable. The hollow profile of the frame 2 formed in accordance with the present invention thus maximally utilises the design space granted it by the drive assembly axles. A constant profile cross-section with no cavities or apertures provided in sections, as shown in FIG. 1, crucially aids the load capacity of the frame 2 when a given material is used for the crane undercarriage.

LIST OF REFERENCE SIGNS 1 suspension
2 drive assembly frame
3 wheel carrier
4, 5, 6 transverse control arm
7 side wall
8 wheel hub drive
9 electric/hydraulic motor
10 wheel
11 rotary joint
12 wheel carrier body
13 bearing head
14 spring suspension cylinder of the suspension
15 power supply
16 rotary union
17 profile segment
18 lower side of the profile
19 lower control arm plane
20 upper control arm plane
21 spherical joint
22 track-steering rod
23 steering lever
24 steering cylinder
25 central steering lever
M plane of symmetry of the frame
D rotational axis of the transverse control arm
L longitudinal axis of the frame

The invention claimed is:

1. A mobile crane comprising:
a drive assembly frame which is configured at least in sections as a hollow profile having profile sides which are formed from multiple profile segments up to a predetermined height, wherein the profile sides are connected to each other such that a horizontal width of the profile increases from a lower side of the drive assembly frame; and
a mobile crane drive assembly axle comprising mutually independent suspensions configured to couple respective wheel carriers arranged on both sides of the drive assembly frame to the drive assembly frame of the mobile crane,
wherein the mutually independent suspensions are each embodied as a double transverse control arm wheel suspension comprising at least one upper transverse control arm overlying a lower transverse control arm,
wherein the at least one upper transverse control arm is arranged in an upper control arm plane of the suspension, and the lower transverse control arm is arranged in a lower control arm plane of the suspension, arranged one above the other in respective control arm planes of the suspension,
wherein the suspension is configured to couple a wheel carrier of the respective wheel carriers to the drive assembly frame with the at least one upper transverse control arm and the lower transverse control arm, wherein the at least one upper transverse control arm and the lower transverse control arm are connected to the drive assembly frame such that the suspensions can be rotated about an axis which extends substantially parallel to the longitudinal axis of the drive assembly frame,
wherein the at least one upper transverse control arm is configured to extend from the wheel carrier to a vertical side wall of the drive assembly frame below the predetermined height,
wherein the lower transverse control arm is configured to extend from the wheel carrier to the lower side of the drive assembly frame, and
wherein drive assembly elements which perform functions of steering rods and track rods are arranged in the lower control arm plane and reach to the lower side of the drive assembly frame.

2. The mobile crane according to claim 1, wherein at least one of the at least one upper transverse control arm of the upper control plane or the lower transverse control arm of the lower control arm plane is configured as a triangular control arm or a quadrilateral control arm.

3. The mobile crane according to claim 1, wherein the at least one upper transverse control arm and the lower transverse control arm each include a triangular control arm, and wherein the at least one upper transverse control arm further comprises another control rod.

4. The mobile crane according to claim 1, wherein the lower transverse control arm includes a triangular control arm, and wherein the at least one upper transverse control arm includes at least one control rod and further includes a longitudinal or oblique control arm.

5. The mobile crane according to claim 1, wherein the suspensions are configured such that in each suspension, the lower transverse control arm is configured to extend from the respective wheel carrier to a central region of the drive assembly frame.

6. The mobile crane according to claim 1, wherein the drive assembly elements are actuated by a steering gear arranged centrally with respect to the drive assembly frame.

7. The mobile crane according to claim 1, wherein the wheel carriers are configured to connect respective wheel hub drives comprising an electric motor or a hydraulic motor for driving the respective wheel.

8. The mobile crane according to claim 7, wherein the wheel carriers each comprise a bearing head mounted on a wheel carrier body via a rotary joint, and on which a spring suspension cylinder and/or at least one of the control arms acts, wherein the bearing head comprises a connection for an energy supply of the respective wheel hub drive, and wherein the joint comprises a feedthrough for the energy supply to the wheel carrier body.

* * * * *